United States Patent
Sashihara

(10) Patent No.: US 12,300,032 B2
(45) Date of Patent: May 13, 2025

(54) INFORMATION PROCESSING DEVICE, INFORMATION PROCESSING METHOD, AND RECORDING MEDIUM

(71) Applicant: NEC Corporation, Tokyo (JP)

(72) Inventor: Toshiyuki Sashihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 212 days.

(21) Appl. No.: 18/015,454

(22) PCT Filed: Jul. 16, 2020

(86) PCT No.: PCT/JP2020/027641
§ 371 (c)(1),
(2) Date: Jan. 10, 2023

(87) PCT Pub. No.: WO2022/014001
PCT Pub. Date: Jan. 20, 2022

(65) Prior Publication Data
US 2023/0282029 A1    Sep. 7, 2023

(51) Int. Cl.
*G06V 40/18*          (2022.01)
*G06T 3/60*           (2024.01)
(Continued)

(52) U.S. Cl.
CPC ............. *G06V 40/197* (2022.01); *G06T 3/60* (2013.01); *G06V 40/1365* (2022.01);
(Continued)

(58) Field of Classification Search
CPC ............. G06V 40/197; G06V 40/1365; G06V 40/172; G06V 40/193; G06V 40/50;
(Continued)

(56) References Cited

U.S. PATENT DOCUMENTS

2015/0347841 A1* 12/2015 Mears .................... G06V 40/19
                                                         348/46
2018/0218212 A1   8/2018 Yoshikawa et al.
(Continued)

FOREIGN PATENT DOCUMENTS

JP    H10-171994 A    6/1998
JP    2002-279402 A   9/2002
(Continued)

OTHER PUBLICATIONS

International Search Report for PCT Application No. PCT/JP2020/027641, mailed on Sep. 8, 2020.

*Primary Examiner* — Wassim Mahrouka

(57) ABSTRACT

The information processing device determines whether or not an inputted iris image is an iris image of a color contact lens. In the information processing device, the acquisition means (71) acquires the target iris image which is the iris image of processing target. The search means (72) searches one or more similar registered iris images that are similar to the target iris images, from the registered iris images. The iris image determination means (73) determines that the target iris image and the similar registered iris image are iris images of the color contact lens when the person corresponding to the target iris image and the person corresponding to the similar registered iris image are different persons.

10 Claims, 11 Drawing Sheets

(51) Int. Cl.
*G06V 40/12* (2022.01)
*G06V 40/16* (2022.01)
*G06V 40/50* (2022.01)

(52) U.S. Cl.
CPC .......... *G06V 40/172* (2022.01); *G06V 40/193* (2022.01); *G06V 40/50* (2022.01)

(58) Field of Classification Search
CPC .......... G06V 10/56; G06V 40/18; G06T 3/60; G06T 7/00
See application file for complete search history.

(56) References Cited

U.S. PATENT DOCUMENTS

2020/0167452 A1* 5/2020 Zhou .................. G06F 21/40
2020/0184186 A1  6/2020 Inoue et al.

FOREIGN PATENT DOCUMENTS

| JP | 2018-124733 A | 8/2018 |
| WO | 2019/044944 A1 | 3/2019 |

* cited by examiner

FIG. 4

<REGISTRATION DATA>

| IRIS IMAGE ID | IRIS IMAGE DATA | COLOR CONTACT LENS ATTRIBUTE | FACE IMAGE DATA |
|---|---|---|---|
| 001 | A00001 | FALSE | B00001 |
| 002 | A00002 | FALSE | B00002 |
| 003 | A00003 | TRUE | B00003 |
| . | . | . | ... |
| . | . | . | ... |

INFORMATION PROCESSING DEVICE, INFORMATION PROCESSING METHOD, AND RECORDING MEDIUM

This application is a National Stage Entry of PCT/JP2020/027641 filed on Jul. 16, 2020, the contents of all of which are incorporated herein by reference, in their entirety.

TECHNICAL FIELD

This disclosure relates to processing of iris images.

BACKGROUND ART

Iris authentication is known as one of biometric authentication. Generally, in iris authentication, the iris pattern of the subject is registered in the database, and the iris pattern acquired from the subject at the time of authentication is checked with the iris pattern registered in the database for authentication.

In recent years, use of color contact lenses has increased mainly for young people. When the subject is wearing color contact lenses, the iris pattern obtained from the subject is affected by the pattern of the color contact lenses. Therefore, if iris recognition is performed without identifying the color contact lenses, the iris pattern of the subject may match the iris pattern of a person wearing the same color contact lenses, and misjudge of determining different persons as the same person occurs. Therefore, some countermeasures are required.

In this regard, Patent Document 1 describes a method for determining that the user is wearing color contact lenses when the pattern of the iris region is uniform or repetition of a predetermined pattern. Also, Patent Document 2 describes a method for extracting feature data from a color contact lens to create a dictionary of color contact lenses.

PRECEDING TECHNICAL REFERENCES

Patent Document

Patent Document 1: Japanese Patent Application Laid-Open under No. 2018-124733
Patent Document 2: Japanese Patent Application Laid-Open under No. JP 2002-279402

SUMMARY

Problem to be Solved

However, the method of Patent Document 1 can only detect a color contact lens having a uniform pattern or a repetitive pattern. While the method of Patent Document 2 can register the patterns of respective color contact lenses, the type of color contact lens is diverse in recent years and it is not realistic to register all the patterns one by one.

It is an object of this disclosure to provide an information processing device capable of detecting a color contact lens from an iris image without the need of registering the patterns of the lenses in advance.

Means For Solving the Problem

In one aspect of this disclosure, an information processing device comprises:
an acquisition means configured to acquire a target iris image which is an iris image of processing target;
a search means configured to search one or more similar registered iris images which are similar to the target iris image, from registered iris images;
an iris image determination means configured to determine that the target iris image and the similar registered iris image are iris images of a color contact lens, when a person corresponding to the target iris image and a person corresponding to the similar registered iris image are different persons.

In another aspect of this disclosure, an information processing method comprises:
acquiring a target iris image which is an iris image of processing target;
searching one or more similar registered iris images which are similar to the target iris image, from registered iris images; and
determining that the target iris image and the similar registered iris image are iris images of a color contact lens, when a person corresponding to the target iris image and a person corresponding to the similar registered iris image are different persons.

In still another aspect of this disclosure, a non-transitory recording medium records a program causing a computer to execute processing of:
acquiring a target iris image which is an iris image of processing target;
searching one or more similar registered iris images which are similar to the target iris image, from registered iris images; and
determining that the target iris image and the similar registered iris image are iris images of a color contact lens, when a person corresponding to the target iris image and a person corresponding to the similar registered iris image are different persons.

BRIEF DESCRIPTION OF THE DRAWINGS

FIG. 4 shows an example of registration data registered in a registration database.

EXAMPLE EMBODIMENTS

Preferred example embodiments of the present disclosure will be described with reference to the accompanying drawings.

Color Contact Lenses

The following example embodiments detect iris images of color contact lenses and register them in a database. "A Color contact lens" is a contact lens of a type that changes the pattern of the iris image when it is worn, and includes a so-called colored contact lens, and a contact lens called "circle lens" that has a doughnut-like edge on the lens to make the pupil appear larger.

First Example Embodiment

Overall Configuration

Figure 1:
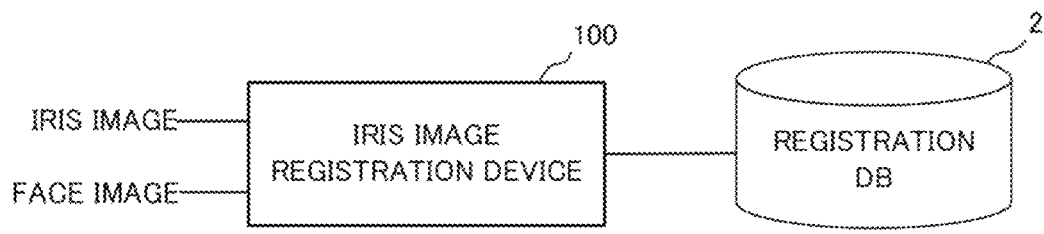
FIG. 1 shows an overall configuration of an iris image registration device according to a first example embodiment.

FIG. 1 shows an overall configuration of an iris image registration device according to a first example embodiment. The iris image registration device 100 receives a pair of an iris image and a face image, and registers them in the registration database (hereinafter "database" will be simply referred to as "DB") 2. At that time, the iris image registration device 100 uses the pair of the iris image and the face image to determine whether or not the iris image is an iris image in a condition of wearing a color contact lens (hereinafter also referred to as "color contact lens iris image"). The iris image registration device 100 adds an attribute indicating whether or not the iris image is the color contact lens iris image and registers the iris image in the registration DB 2 together with the attribute. The iris image registered in the registration DB 2 is used for iris authentication using the iris image.

Hardware Configuration

Figure 2:
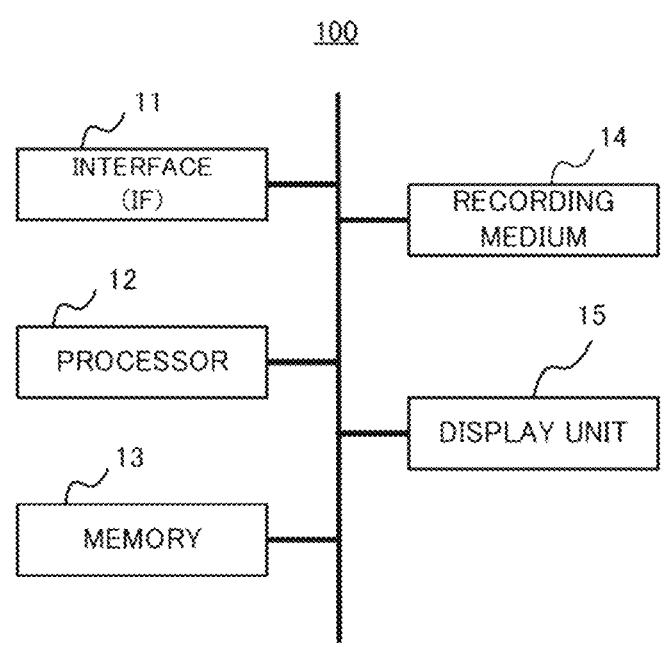
FIG. 2 is a block diagram illustrating a hardware configuration of the iris image registration device.

FIG. 2 is a block diagram showing a hardware configuration of the iris image registration device 100. As shown, the iris image registration device 100 includes an interface (IF) 11, a processor 12, a memory 13, a recording medium 14, and a display 15.

The IF 11 inputs and outputs data to and from external devices. Specifically, the pairs of the iris image and the face image obtained from the registration target person are inputted to the iris image registration device 100 via the IF 11. Also, the registration data generated by the iris image registration device 100 is outputted to the registration DB 2 via the IF 11.

The processor 12 is a computer, such as a CPU (Central Processing Unit), and executes a program prepared in advance to control the entire iris image registration device 100. The processor 12 may be a GPU (Graphics Processing Unit) or a FPGA (Field-Programmable Gate Array). Specifically, the processor 12 executes iris image registration processing, color contact lens determination processing, and the like which will be described later.

The memory 13 may be configured by a ROM (Read Only Memory) and a RAM (Random Access Memory). The memory 13 is used as a working memory during various processing by the processor 12.

The recording medium 14 is a non-volatile and non-transitory recording medium such as a disk-like recording medium, a semiconductor memory, or the like, and is configured to be detachable from the iris image registration device 100. The recording medium 14 records various programs executed by the processor 12. When the iris image registration device 100 executes various processing, the program recorded on the recording medium 14 is loaded into the memory 13 and executed by the processor 12.

The display unit 15 is a liquid crystal display or the like, and displays information and messages necessary at the time of registration of the iris image or at the time of authentication using the iris image. The iris image registration device 100 may further include a keyboard, an input unit such as a mouse, and a voice output unit such as a speaker for outputting voice messages to allow an administrator or the like to give instructions or inputs.

Functional Configuration

Figure 3:
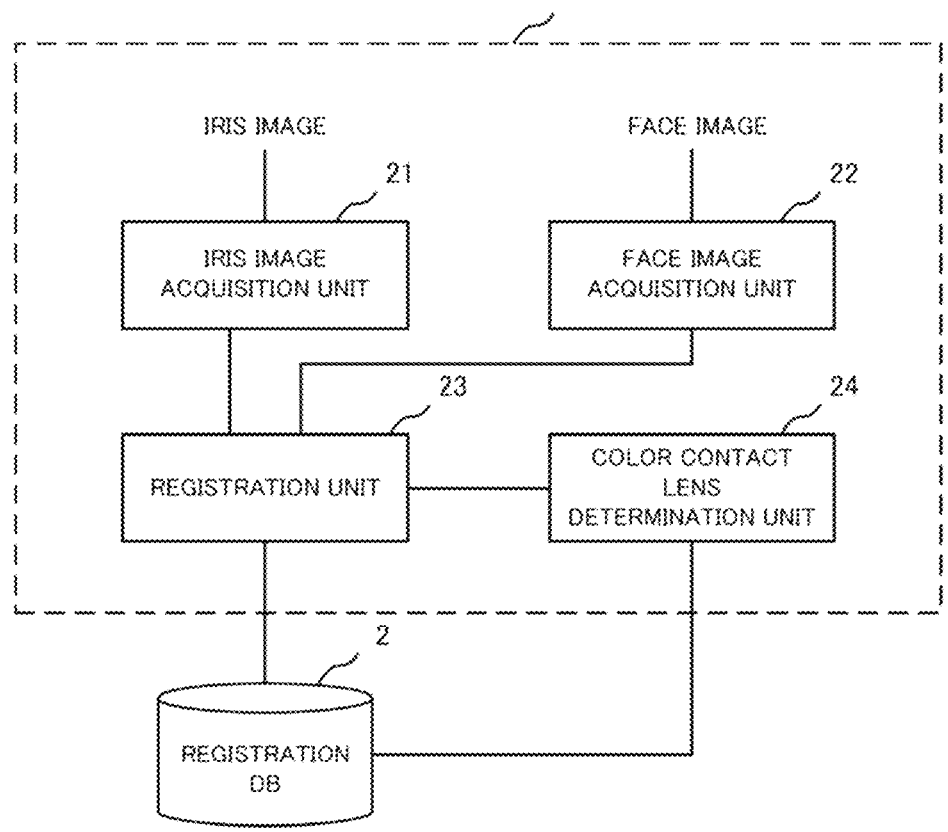
FIG. 3 is a block diagram showing a functional configuration of the iris image registration device.

FIG. 3 is a block diagram showing a functional configuration of the iris image registration device 100. The iris image registration device 100 includes an iris image acquisition unit 21, a face image acquisition unit 22, a registration unit 23, and a color contact lens determination unit 24.

The iris image acquisition unit 21 acquires the iris image of the registration target person (hereinafter, also referred to as "target iris image"). Specifically, the iris image acquisition unit 21 is connected to an iris camera or the like for capturing a portion of the pupil of the registration target person by infrared, and acquires the captured image by the iris camera as the target iris image. Instead, the iris image acquisition unit 21 may acquire the target iris image of the registration target person from a database or the like that stores the iris images captured in advance using the iris camera. The iris image acquisition unit 21 outputs the target iris image thus acquired to the registration unit 23.

The face image acquisition unit 22 acquires the face image of the registration target person (hereinafter, also referred to as "target face image"). The face image may be of any type by which at least face recognition can be executed. Specifically, the face image acquisition unit 22 acquires a captured image by a camera (also referred to as a "face image camera") for capturing the face of the registration target person as the target face image. Instead, the face image acquisition unit 22 may acquire the target face image of the registration target person from a database or the like that stores the previously captured face images. The face image acquisition unit 22 outputs the target face image thus acquired to the registration unit 23.

Here, it is necessary that the iris image acquired by the iris image acquisition unit 21 and the face image acquired by the face image acquisition unit 22 are the images of the same registration target person. Therefore, for example, when the images captured by the camera are used, the iris image and the face image of the same registration target person are captured in order by the iris camera and the face image camera, and inputted to the iris image acquisition unit 21 and the face image acquisition unit 22, respectively. Also, when the images are acquired from a database or the like, the iris image acquisition unit 21 and the face image acquisition unit 22 respectively acquire the iris image and the face image corresponding to the same person on the basis of an ID or the like that identifies the target person.

When registering the acquired target iris image and the acquired target face image in the registration DB 2, the registration unit 23 checks whether or not the target iris image is the color contact lens iris image. Therefore, the registration unit 23 outputs the acquired target iris image and the acquired target face image to the color contact lens determination unit 24.

Using the inputted target iris image, the inputted target face image, and the iris image and face image registered in the registration DB 2, the color contact lens determination unit 24 determines whether or not the target iris image is the color contact lens iris image and outputs the determination result to the registration unit 23. The basic method of determining whether or not the iris image is the color contact lens iris image is as follows.

As is known as the premise of iris authentication, the human iris pattern is unique to each person, and the iris patterns of different persons do not match. However, if the target person wears color contact lenses, the iris pattern detected from the iris image becomes nearly similar to the pattern of the color contact lens. Therefore, the iris patterns acquired from different persons wearing the same color contact lenses becomes similar. In other words, if the iris patterns acquired from different persons are similar, those iris patterns are likely to be the patterns of identical color contact lens.

In this view, the color contact lens determination unit 24 first searches a registered iris image similar to the target iris image (hereinafter, also referred to as "similar registered iris image") among the iris images already registered in the registration DB 2 (hereinafter, also referred to as "registered iris image"). When the similar registered iris image is found, the color contact lens determination unit 24 determines whether or not the similar registered iris image thus found is the image of the same person as the registration target person. Specifically, the color contact lens determination unit 24 compares the registered face image corresponding to the similar registered iris image (hereinafter, also referred to as "registered face image") with the target face image of the registration target person and determines whether or not they are the images of the same person. When the registered face image corresponding to the found similar registered iris image is different from the target face image of the registration target person, i.e., when they are the face images of different persons, the color contact lens determination unit 24 determines that both the similar registered iris image and the target iris image are the color contact lens iris images. On the other hand, when the registered face image corresponding to the found similar registered iris image matches the target face image of the registration target person, i.e., when they are the face images of the same person, the color contact lens determination unit 24 does not determine the similar registered iris image and the target iris image as the color contact lens iris images. In this case, it is presumed that the a person who has already been registered in the registration DB 2 tried to register himself or herself again.

Thus, when there is a similar registered iris images which is similar to the target iris image and they are determined to be the images of different persons based on the face images, the color contact lens determination unit 24 determines that those iris images are the color contact lens iris images. Then, the color contact lens determination unit 24 outputs the determination result to the registration unit 23. Specifically, when the target iris image is not the color contact lens iris image, the color contact lens determination unit 24 simply outputs the fact to the registration unit 23 as the determination result. On the other hand, when the target iris image is the color contact lens iris image, the color contact lens determination unit 24 outputs, to the registration unit 23, the determination result indicating that the target iris image is the color contact lens iris image and that all the one or more similar registered iris images thus found are the color contact lens iris images. For example, the color contact lens determination unit 24 outputs, to the registration unit 23, the iris image IDs of the one or more similar registered iris images thus found.

The registration unit 23 registers the target iris image and the target face image in the registration DB 2 on the basis of the determination result inputted from the color contact lens determination unit 24. At this time, the registration unit 23 adds an attribute indicating whether or not the iris image is the color contact lens iris image to the iris image. FIG. 4 shows an example of the registration data registered in the registration DB 2. Each registered data includes an iris image ID, iris image data, a color contact lens attribute, and face image data. Here, "iris image ID" is an identification information of the iris image. Instead of the iris image ID, a person ID or the like that identifies a registered person may be used. "Iris image data" indicates the file name of the registered iris image data. In this example, as the "color contact lens attribute", a binary value (Boolean value) is used. "TRUE" is set if the iris image is the color contact lens iris image, and "FALSE" is set if the iris image is not the color contact lens iris image. "Face image data" indicates the file name of the face image data paired with the iris image data.

As described above, when the color contact lens determination unit 24 determines that the target iris image is the color contact lens iris image, it outputs the iris image ID or the like of the similar registered iris image which is found to be similar to the target iris image. Therefore, the registration unit 23 changes the color contact lens attribute of the similar registered iris image from "FALSE" to "TRUE" in addition to the registration of the target iris image. Thus, all the registered iris images found to be similar to the target iris image are changed to the color contact lens iris images.

As described above, according to the iris image registration device 100 of the first example embodiment, it is possible to determine whether or not the target iris image is the color contact lens iris image by detecting a registered iris image similar to the target iris image and determining whether or not it is the image of the same person. In addition, when the target iris image is determined to be the color contact lens iris image, all the registered iris images similar thereto can be registered again as the color contact lens iris images.

In the above-described configuration, the iris image acquisition unit 21 and the face image acquisition unit 22 are examples of the acquisition means. The color contact lens determination unit 24 is an example of the search means, the person determination means, and the iris image determination means. The registration unit 23 is an example of the registration means.

Iris Image Registration Processing

Figure 5:
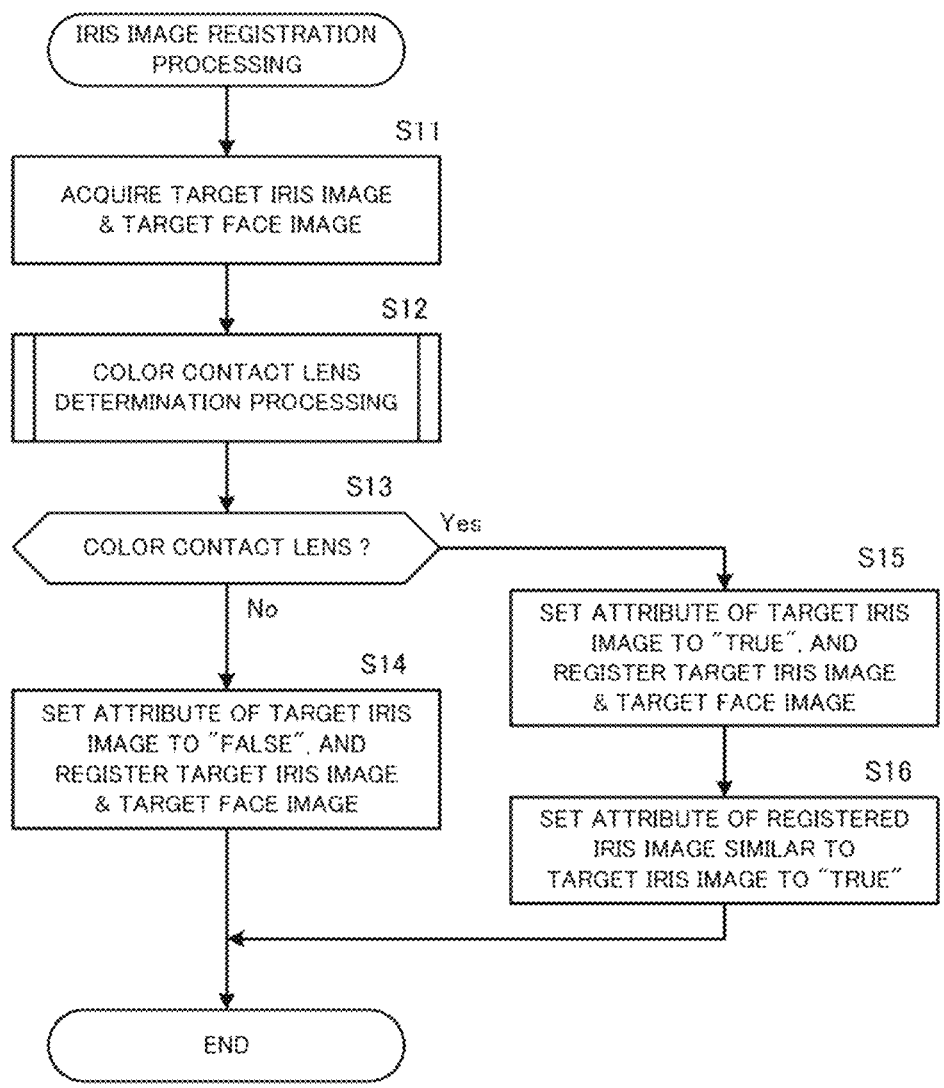
FIG. 5 is a flowchart of iris image registration processing according to the first example embodiment.

Next, iris image registration processing according to the first example embodiment will be described. FIG. 5 is a flowchart illustrating the iris image registration processing according to the first example embodiment. This processing is realized by the processor 12 shown in FIG. 2, which executes a pre-prepared program and operates as each element shown in FIG. 3.

First, the iris image acquisition unit 21 acquires the target iris image, and the face image acquisition unit 22 acquires the target face image. The registration unit 23 acquires the target iris image and the target face image from the iris image acquisition unit 21 and the face image acquisition unit 22, respectively (step S11). Next, the registration unit 23 outputs the acquired target iris image and the target face image to the color contact lens determination unit 24, and the color contact lens determination unit 24 executes color contact lens determination processing (step S12).

Figure 6:
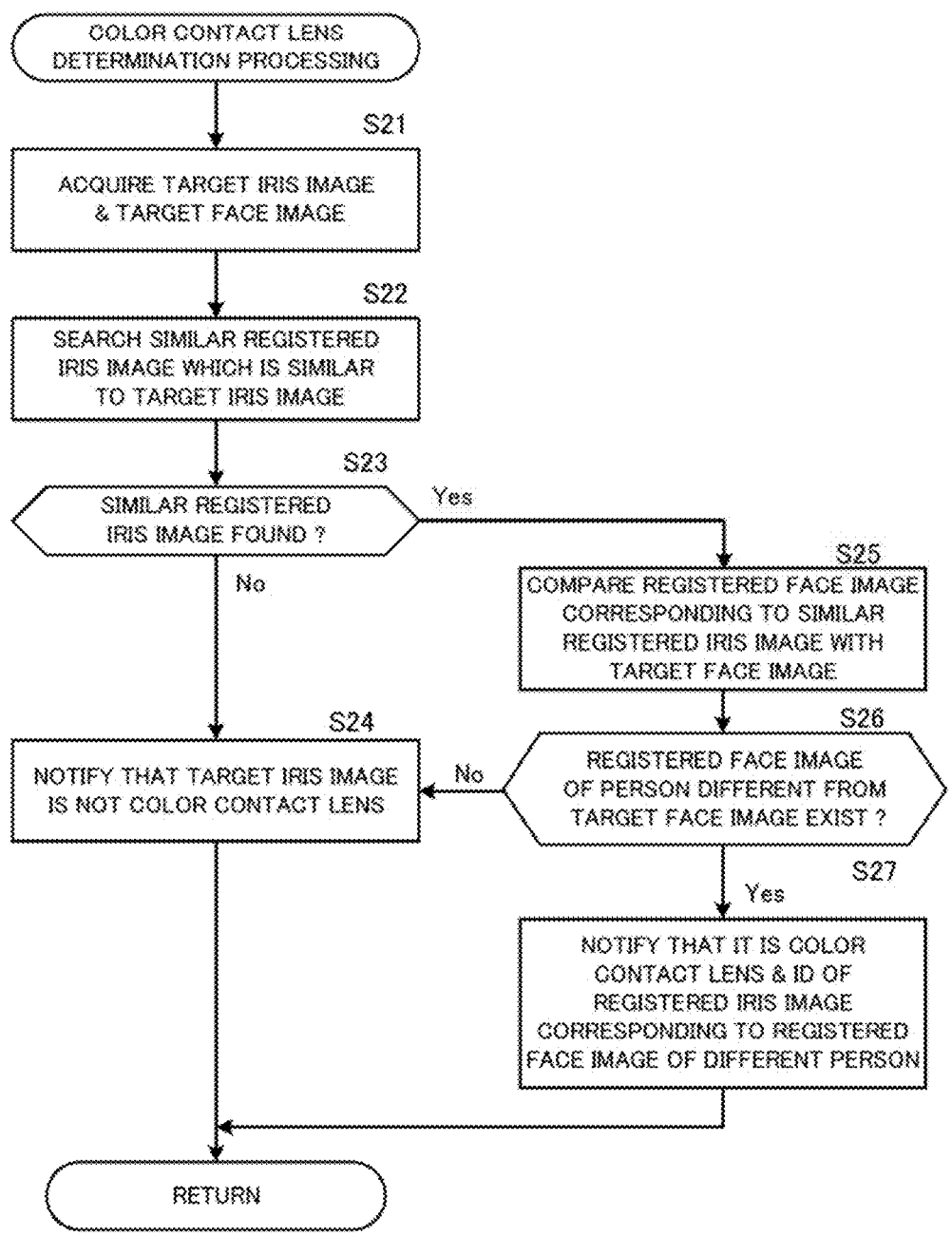
FIG. 6 is a flowchart of color contact lens determination processing.

FIG. 6 is a flowchart of the color contact lens determination processing. The color contact lens determination unit 24 acquires the target iris image and the target face image from the registration unit 23 (step S21), and searches for a similar registered iris image which is similar to the target iris image in the registration DB 2 (step S22). When the similar registered iris image is not found (step S23: No), the color contact lens determination unit 24 notifies the registration unit 23 of the determination result indicating that the target iris image is not the color contact lens iris image (step S24). Then, the processing returns to the main routine of FIG. 5.

On the other hand, when one or more similar registered iris images are found (step S23: Yes), the color contact lens determination unit 24 compares the registered face images corresponding to the found similar registered iris images with the target face image inputted from the registration unit 23 (step S25).

When there is no registered face image of the person different from the target face image (step S26: No), the target iris image and the similar registered iris image are considered to be the same person's iris images. In other words, it is considered that the registered person made the registration of the iris image again. Therefore, the color contact lens determination unit 24 notifies the registration unit 23 of the determination result indicating that the target iris image is not the color contact lens iris image (step S24). Then, the processing returns to the main routine of FIG. 5.

On the other hand, when there are one or more registered face images of persons different from the target face image (step S26: Yes), the target iris image is considered to be the color contact lens iris image. Therefore, the color contact lens determination unit 24 notifies the registration unit 23 of the determination result indicating the fact. Specifically, the color contact lens determination unit 24 notifies the registration unit 23 of the determination result indicating that the target iris image is the color contact lens iris image and including the iris image IDs of the registered iris images corresponding to the one or more registered face images found in step S26 (step S27). Then, the processing returns to the main routine of FIG. 5.

It is now assumed that a first probability is a probability that the determination result indicating that the face image is another person's image is incorrect. Also, it is assumed that a second probability is a probability that the determination result indicating that the iris pattern is the same is correct. In this case, in order to accurately determine whether or not there are one or more registered face images of persons different from the target face image in step S26, it is necessary that the second probability is larger than the first probability.

Returning to FIG. 5, when the determination result notified from the color contact lens determination unit 24 indicates that the target iris image is not the color contact lens iris image (step S13: No), the registration unit 23 sets the color contact lens attribute of the target iris image to "FALSE" and registers the target iris image and the target face image to the registration DB 2 (step S14). On the other hand, when the determination result notified from the color contact lens determination unit 24 indicates that the target iris image is the color contact lens iris image (step S13: Yes), the registration unit 23 sets the color contact lens attribute of the target iris image to "TRUE" and registers the target iris image and the target face image to the registration DB 2 (step S15). Further, the registration unit 23 sets the color contact lens attribute of all the similar registered iris images which are similar to the target iris image to "TRUE" on the basis of the iris image IDs notified from the color contact lens determination unit 24 (step S16). That is, when there are similar registered iris images which are similar to the target iris image, the registration unit 23 sets the color contact lens attributes of all the similar registered iris images to "TRUE". Thus, the color contact lens attributes for the iris images that have already been registered are changed. Then, the iris image registration processing ends.

Modifications

Next, a description will be given of modifications of the first example embodiment. The following modifications can be implemented in an appropriate combination.

First Modification

In the above-described first example embodiment, the determination of the color contact lens iris image was performed at the time of registration of the iris image. However, the timing of determining the color contact lens iris image is not limited to the time of registration of the iris image. For example, the color contact lens determination processing may be executed by a batch process at a predetermined time once a day. The color contact lens determination processing in this case is basically the same as that described with reference to FIG. 6. However, in step S21, the color contact lens determination unit 24 sequentially acquires the pairs of the iris image and the face image registered in the registration DB 2 one by one, and executes the processing illustrated in FIG. 6 using the pairs as the target iris image and the target face image.

Second Modification

In step S23 of the color contact lens determination processing shown in FIG. 6, a registered iris image similar to the target iris image is searched. At that time, it is preferable collate the registered iris image with the target iris image by rotating those iris images. This is because people wear the color contact lenses in various orientations. Specifically, the color contact lens determination unit 24 performs collation while rotating one of the target iris image and the registered iris image serving as the subject of collation relative to the other, and may use the maximum value of the obtained degree of similarity to determine whether or not they are similar.

Third Modification

In the above example embodiment, as illustrated in FIG. 4, the color contact lens attribute is a binary value (Boolean value) of "TRUE" and "FALSE". Instead, the color contact lens attribute may be a number of the registered iris images similar to the target iris image, or a value depending on the number. In the color contact lens determination processing described above, when there is a different person's registered iris image similar to the target iris image, the target iris image is determined to be the color contact lens iris image. In this case, since the registered iris image similar to the target iris image is considered to be the color contact lens iris image. Therefore, it is considered that the greater the number of the registered iris images similar to the target iris image, the greater the probability that the target iris image is the color contact lens iris image. In this view, the number of the registered iris images of different persons that are similar to the target iris image, or a value proportional to the number, may be used as the color contact lens attribute. In this case, the higher the value of the color contact lens attribute, the higher the probability that the target iris image is the color contact lens iris image.

Fourth Modification

In the above-described example embodiment, the color contact lens determination processing uses the face images to determine whether or not the target iris image and the similar registered iris image are the images of the same person. Instead, biometric authentication using other biometric information such as fingerprint images, palmprint images, and voice data may be performed to determine whether or not the target iris image and the similar registered iris image are the images of the same person. In that case, those biometric data may be registered in the registration DB 2 in association with the iris images. In addition to the so-called biological information, the determination of whether the person is the same or not may be performed based on physical features of the person (e.g., fingerprints, vein information, pulses, faces, iris, retina, auricle, external auditory canal, brain wave, appearance, or the like), or based on active features of the person (e.g., handwriting, typing, voiceprints, lip movements, blinking, gait, or the like).

Fifth Modification

In registering the color contact lens iris image, multiple iris images may be taken and combined to produce the color contact lens iris image to be registered. Specifically, when registering the color contact lens iris image, guidance such as "Please blink" and "Please move the eyeballs" may be given to the registration target person, and multiple iris images may be taken at a predetermined cycle. At this time, since the color contact lens shifts by the blinking or the movement of the eyeballs, the iris area which is not affected by the color contact lens in the taken image changes.

Figure 7:
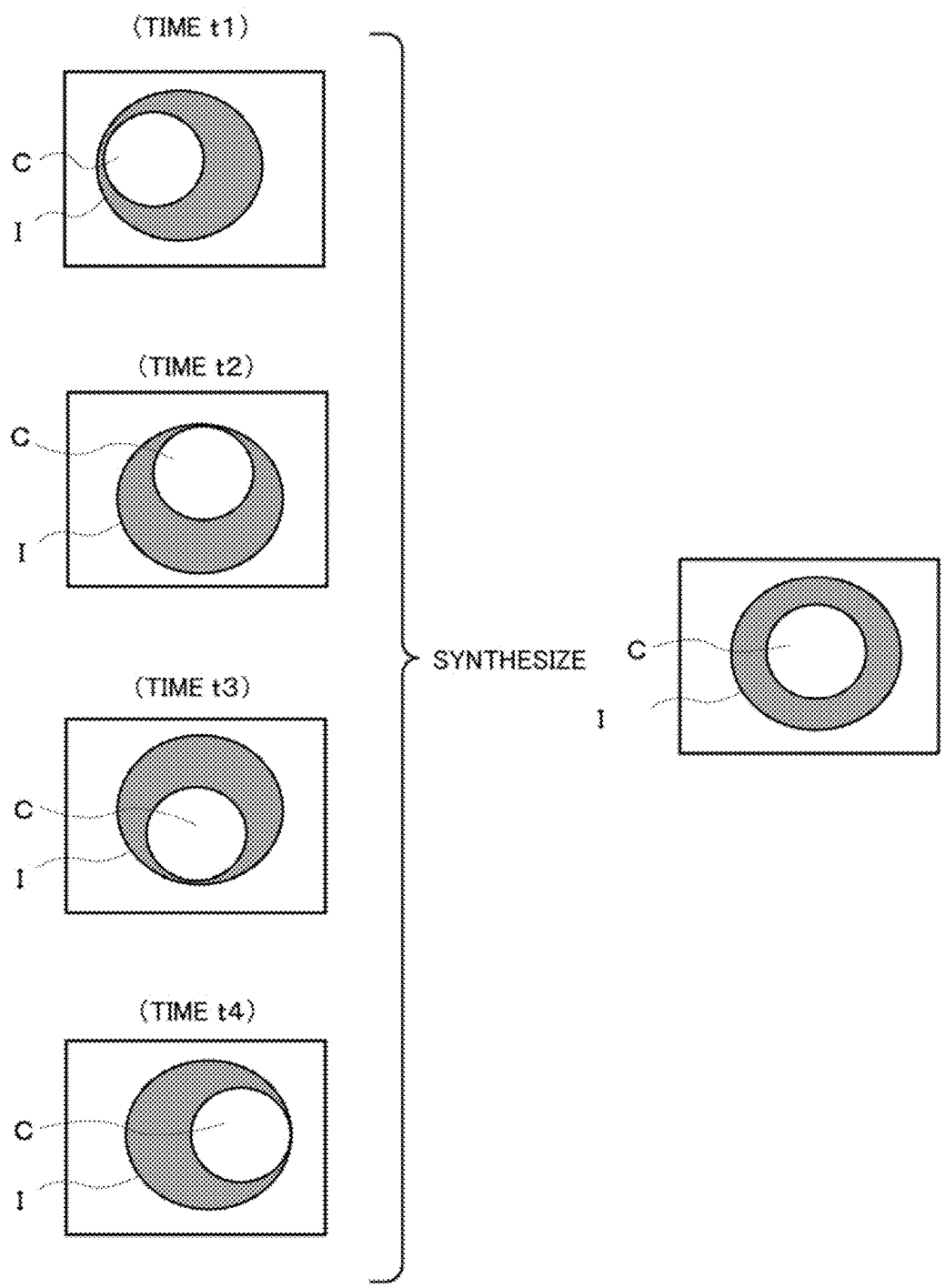
FIG. 7 shows a method for generating a color contact lens iris image according to a fifth modification.

FIG. 7 shows samples of color contact lens iris images at differing times (t1~t4). In each image, a color contact lens C overlaps on the iris I. However, as shown, even when the color contact lens C is worn, there is an area that is not covered by the color contact lens C. When the registration target person blinks or moves the eyeballs, the area of the iris I that is not covered by the color contact lens C changes. Therefore, from the color contact lens iris image at each time, the iris image of the area not covered by the color contact lens C is extracted, and the iris image is synthesized. Thus, it becomes possible to generate and register the color contact lens iris image in which the influence of the color contact lens C is reduced as much as possible.

When the color contact lens iris image generated as described above can reduce the effect of the color contact lens to the level of accuracy suitable for iris authentication, the color contact lens attribute of the iris image may be changed from "TRUE" to "FALSE," or from "TRUE" to a third flag (e.g., "Synthesized" or the like) which indicates that the color contact lens iris image is an image generated by synthesizing multiple color contact lens iris images.

Sixth Modification

When the color contact lens attribute stored in the registration DB 2 is changed in step S16 of FIG. 5, a notification indicating that fact may be transmitted to a terminal device of the registered person. For example, when the color contact lens attribute of the registered iris image is changed to "TRUE", the iris image registration device 100 notifies the registered person's terminal device that "Since your registered iris image is with color contact lenses, please register your iris image again without the color contact lenses." This facilitates registration of iris images without color contact lenses.

Seventh Modification

In the above-described example embodiment, the color contact lens determination unit 24 outputs the determination result of whether or not the target iris image is the color contact lens iris image to the registration unit 23, and the registration unit 23 changes the color contact lens attribute. Instead, the color contact lens determination unit 24 may change the color contact lens attribute of the iris image determined to be the color contact lens iris image by itself without returning the determination result to the registration unit 23.

Iris Authentication Using Registered Data

The iris images registered by the iris image registration processing described above are used in the subsequent iris authentication processing. At the time of the iris authentication processing, iris authentication is performed according to the color contact lens attribute. Specifically, when the color contact lens iris image is not used for iris authentication, the iris authentication device performs authentication using only the iris images which are not the color contact lens iris images, from among the iris images registered in the registration DB 2. For example, in the first example embodiment described above, the iris authentication device performs iris authentication using only iris images for which the color contact lens attribute is "FALSE". In the third modification described above, the iris authentication device may perform iris authentication using only the iris images for which the value of the color contact lens attribute is lower than a predetermined threshold value. On the other hand, when there are many types of color contact lenses and the matching of the color contact lens iris images is considered to be effective for the identification of individuals to some extent, iris recognition may be performed by collating the iris images whose color contact lens attribute is "TRUE".

Effect of the First Example Embodiment

According to the configuration of the first example embodiment, it is possible to determine whether or not the target iris image is the color contact lens iris image by detecting a registered iris image similar to the target iris image and determining whether it is the image of the same person. In addition, when the target iris image is determined to be the color contact lens iris image, all the registered iris images similar to the target iris image can be registered as the color contact lens iris images.

Second Example Embodiment

Next, a description will be given of a second example embodiment of the present disclosure. The second example embodiment prompts the user to register the iris image without wearing color contact lenses. The following second example embodiment assumes a situation where iris authentication is used for the purpose of cashless payment, for example. Since the hardware configuration of the authentication device according to the second example embodiment is basically the same as that of the first example embodiment shown in FIG. 2, the description thereof will not be repeated.

Functional Configuration

Figure 8:
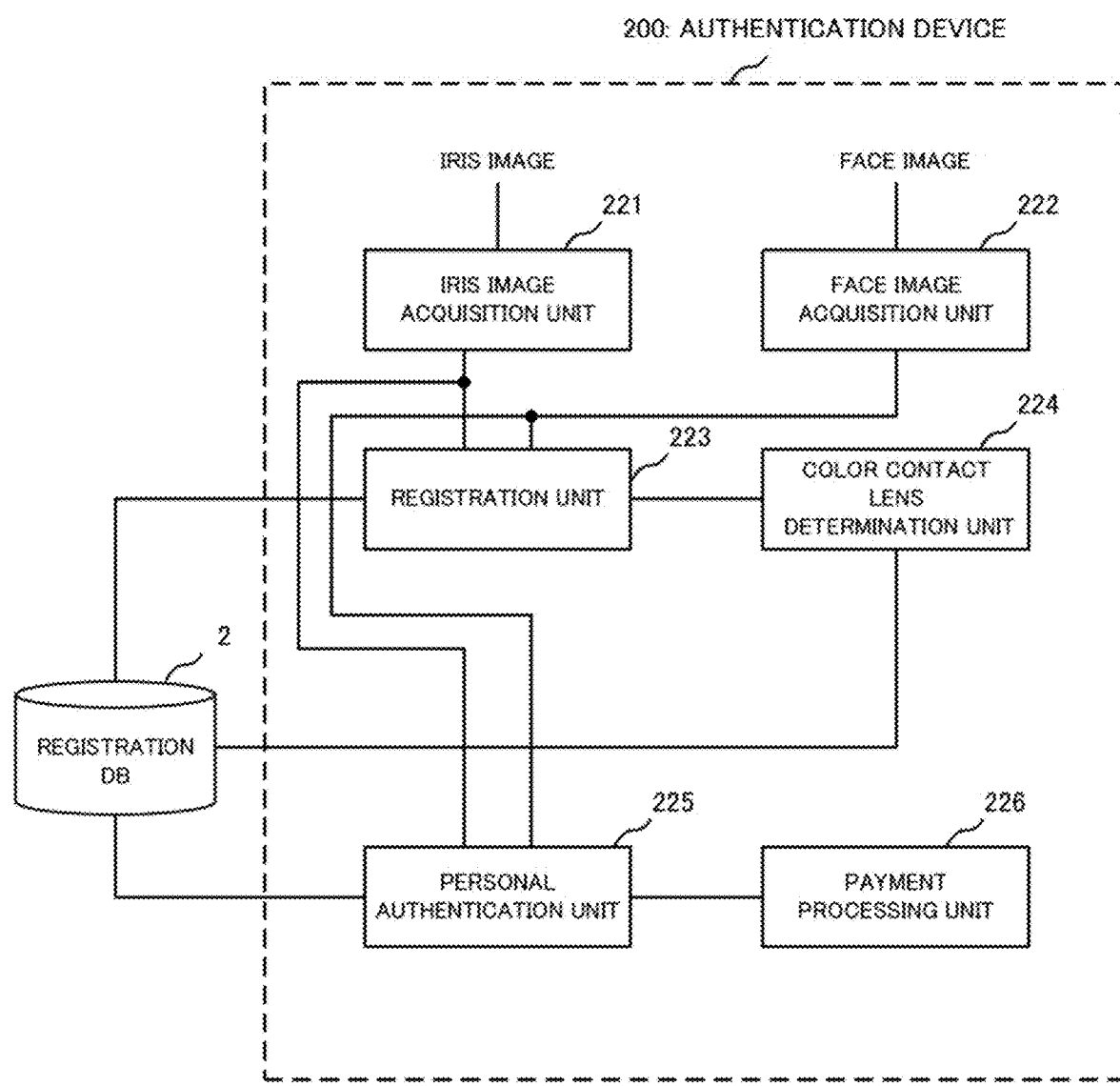
FIG. 8 is a block diagram showing a functional configuration of an authentication device according to a second example embodiment.

FIG. 8 shows a functional configuration of an authentication device according to the second example embodiment. The authentication device 200 is connected to the registration DB 2 and includes an iris image acquisition unit 221, a face image acquisition unit 222, a registration unit 223, a color contact lens determination unit 224, a personal authentication unit 225, and a payment processing unit 226. Here, the iris image acquisition unit 221, the face image acquisition unit 222, the registration unit 223, and the color contact lens determination unit 224 are the same as the iris image acquisition unit 21, the face image acquisition unit 22, the registration unit 23, and the color contact lens determination unit 24 of the first example embodiment, respectively.

The personal authentication unit 225 performs personal authentication of the user using the inputted iris image and face image, and the iris image and face image registered in the registration DB 2, and outputs the result to the payment processing unit 226. The payment processing unit 226 executes the payment processing when the personal authentication of the user is successful, and does not execute the payment processing when the personal authentication is failed.

Iris Image Registration Processing

Figure 9:
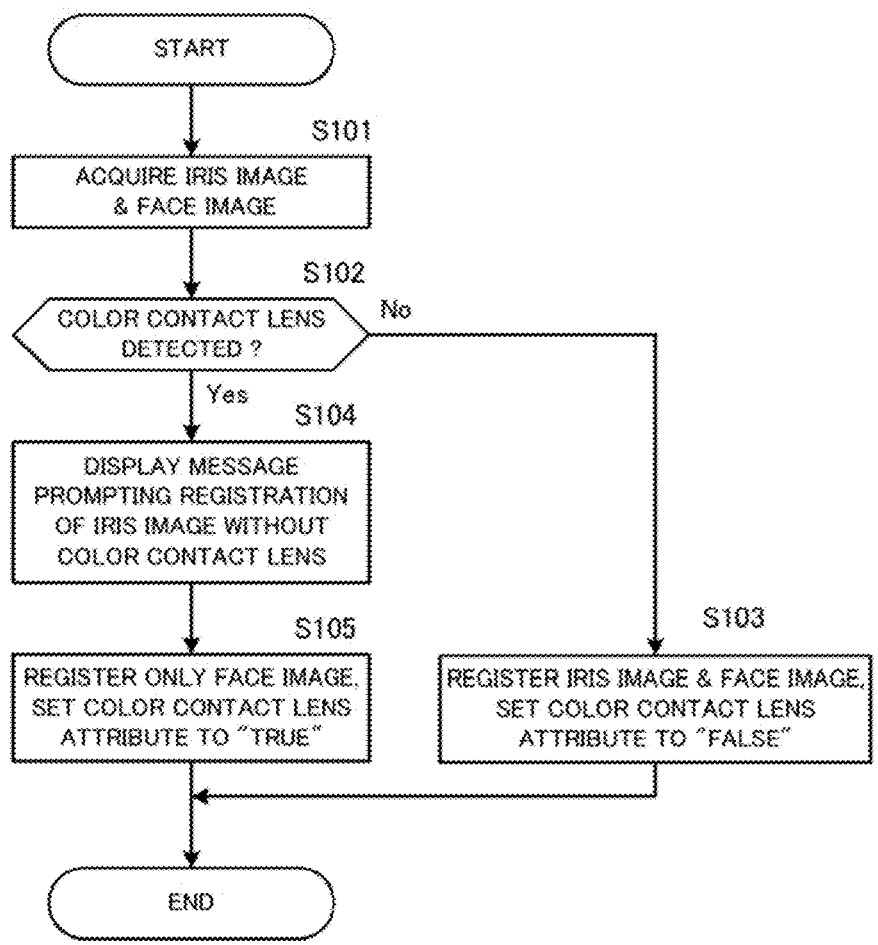
FIG. 9 is a flowchart of iris image registration processing according to the second example embodiment.

Next, the iris image registration processing according to the second example embodiment will be described. FIG. 9 is a flowchart illustrating iris image registration processing executed when a user visits a store for the first time. This processing is realized by the processor 12 shown in FIG. 2, which executes a program prepared in advance and operates as each element shown in FIG. 8.

First, the registration unit 223 acquires the target iris image and the target face image from the iris image acquisition unit 221 and the face image acquisition unit 222, respectively (step S101). Next, the color contact lens determination unit 224 executes the color contact lens determination processing using the iris image and the face image acquired in step S101 (step S102). When it is determined that the iris image acquired in step S101 is not the color contact lens iris image (step S102: No), the registration unit 223 registers the iris image and the face image in the registration DB 2 and sets the color contact lens attribute to "FALSE" (step S103).

On the other hand, when it is determined that the iris image acquired in step S101 is the color contact lens iris image (step S102: Yes), the registration unit 223 displays a message prompting registration of the iris image without the color contact lenses (step S104). For example, the registration unit 223 displays a message such as "Please register your iris image without color contact lenses at the next time." Then, the registration unit 223 does not register the color contact lens iris image in the registration DB 2, registers only the face image, and sets the color contact lens attribute to "TRUE" (step S105). Thus, the processing for the user's first visit to the store ends.

Figure 10:
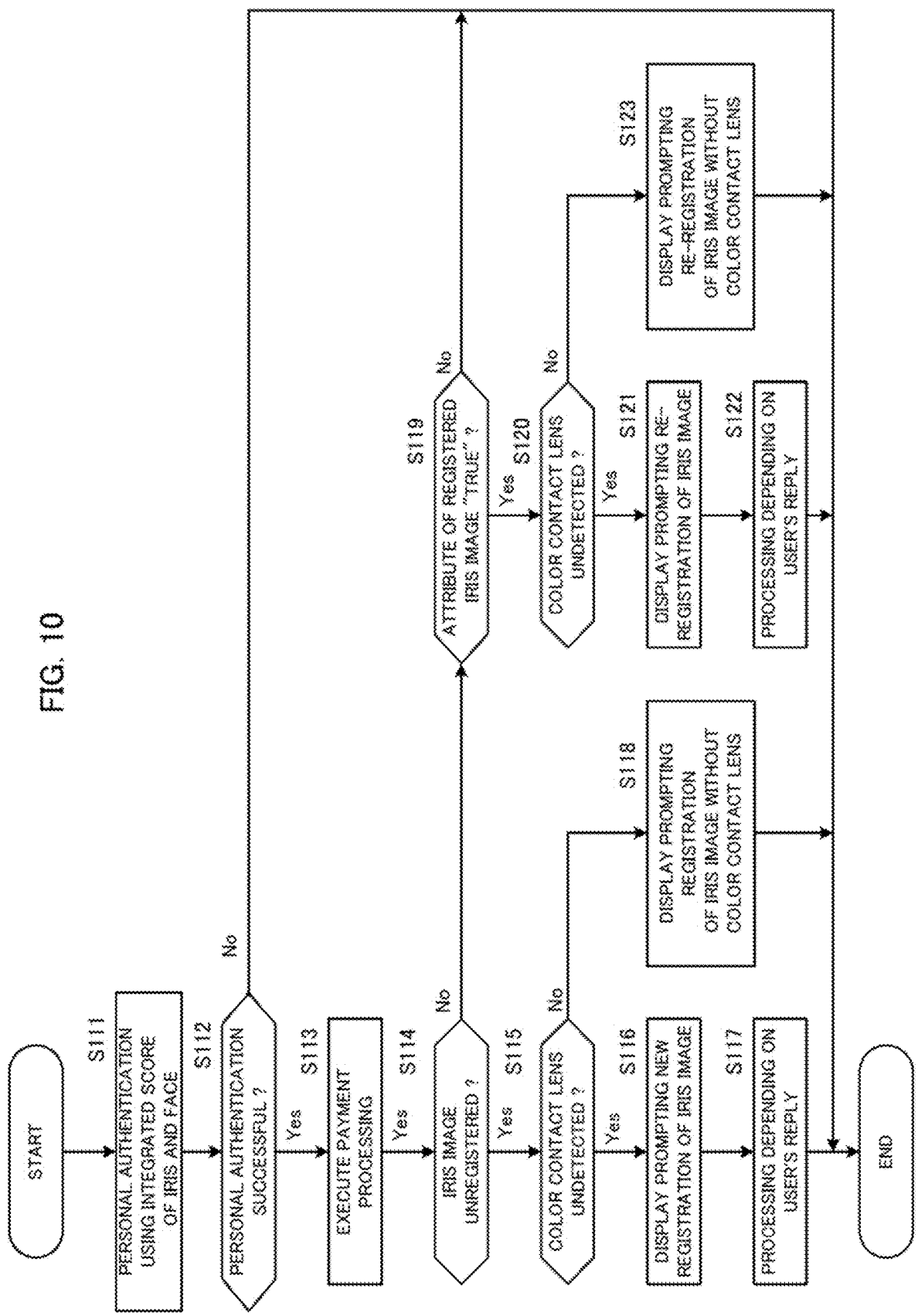
FIG. 10 is a flowchart of authentication processing according to the second example embodiment.

FIG. 10 is a flowchart of payment processing executed at the time of the second or subsequent visit of the user. This processing is realized by the processor 12 shown in FIG. 2, which executes a program prepared in advance and operates as each element shown in FIG. 8.

When the iris image and the face image of the user who wants to perform the cashless payment are inputted, the personal authentication unit 225 acquires the iris image from the iris image acquisition unit 112 and acquires the face image from the face image acquisition unit 222. Then, the personal authentication unit 225 performs iris authentication and face authentication using the acquired iris image and face image, and performs personal authentication using the integrated score of the iris authentication and the face authentication (step S111). When the personal identification is failed (step S112: No), the processing ends.

On the other hand, when the personal authentication is successful (step S112: Yes), the payment processing unit 226 executes the payment processing (step S113). Next, the registration unit 223 refers to the registration DB 2 and determines whether or not the iris image is unregistered for the user (step S114). When the iris image is unregistered (step S114: Yes), the registration unit 223 determines whether or not a color contact lens is undetected in the personal authentication of this time (step S115).

When the color contact lens is undetected in the personal authentication of this time (step S115: Yes), the registration unit 223 performs a display prompting new registration of the iris image (step S116). For example, the registration unit 223 displays a message "Your iris image is not registered. Do you want to register your iris image?" Then, the registration unit 223 performs processing according to the user's reply (step S117). Specifically, depending on the user's reply, the registration unit 223 registers the iris image captured this time in the registration DB 2, or newly captures the iris image and register it, or skips the registration of the iris image this time. Then, the processing ends.

On the other hand, when the color contact lens is detected in the present personal authentication (step S115: No), the registration unit 223 performs a display prompting new registration of the iris image without the color contact lens (step S118). For example, the registration unit 223 displays a message "Your iris image is not registered. Please register the iris image when you are not wearing color contact lenses.". Then, the processing ends.

When it is determined that the iris image is not unregistered in step S114, i.e., the iris image is registered (step S114: No), the registration unit 223 determines whether or not the color contact lens attribute of the registered iris image is "TRUE" (step S119). When the color contact lens attribute of the registered iris image is not "TRUE" (step S119: No), the processing ends. On the other hand, when the color contact lens attribute of the registered iris image is "TRUE" (step S119: Yes), the registration unit 223 determines whether or not the color contact lens is undetected in the personal authentication of this time (step S120).

When the color contact lens is undetected in the personal authentication this time (step S120: Yes), the registration unit 223 performs a display prompting re-registration of the iris image (step S121). For example, the registration unit 223 displays a message "A color contact lens is detected from the previously registered iris image. Do you want to re-register the iris image?". Then, the registration unit 223 performs processing according to the user's reply (step S122). Specifically, depending on the user's reply, the registration unit 223 re-registers the iris image captured this time in the registration DB 2, or captures a new iris image and register it, or skips the registration of the iris image this time. Then, the processing ends.

On the other hand, when the color contact lens is detected in the personal authentication of this time (step S120: No), the registration unit 223 makes a display prompting re-registration of the iris image without the color contact lens (step S123). For example, the registration unit 223 displays a message "A color contact lens is detected from the previously registered iris image. Please re-register the iris image when you are not wearing color contact lenses." Then, the processing ends.

In the processing of FIGS. 9 and 10, the registration unit 223 displays a message to the user. However, a message may be outputted by voices instead, or both the display of the message and the audio output may be performed.

Modification

In the iris image registration processing of FIG. 9, the color contact lens iris image is not registered in the registration DB 2 in step S105. However, the color contact lens iris image may be registered in the registration DB 2. Since the color contact lens iris image of the same pattern has already been registered in the registration DB 2, it is not necessary to register the color contact lens iris image in step S105. However, in the case where the color contact lens iris image is registered in the registration DB 2 in this situation, when another person wearing the color contact lenses of the same pattern registers the iris image, the number of the registered color contact lens iris images of the same pattern can be increased. This is effective to contribute to the improvement of the determination accuracy of the color contact lens iris image.

Incidentally, in this case, it is determined that the iris image has already been registered in step S114 of the payment processing shown in FIG. 10. Therefore, it is determined that the iris image is not registered in step S114 only in the case where the user has not taken any action to register the iris image.

Effect of the Second Example Embodiment

As described above, according to the configuration of the second example embodiment, when the iris image is unregistered, the registration unit 223 prompts the registration of the iris image without color contact lens. In addition, when the iris image is registered and it is later found to be the color contact lens iris image, the registration unit 223 prompts re-registration of the iris image without the color contact lens. This facilitates registration of iris images without color contact lens.

Third Example Embodiment

Figure 11:
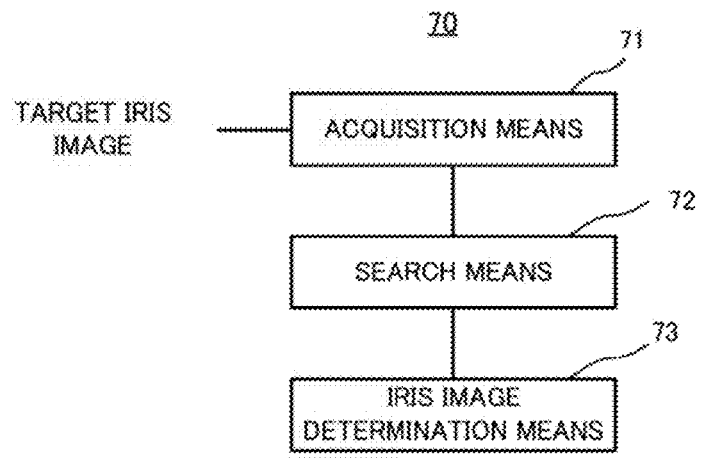
FIG. 11 is a block diagram showing a functional configuration of an information processing device according to a third example embodiment.

Next, a third example embodiment of this disclosure will be described. FIG. 11 is a block diagram illustrating a functional configuration of an information processing device according to a third example embodiment. The information processing device 70 determines whether or not an inputted iris image is an iris image of a color contact lens. Specifically, the information processing device 70 includes an acquisition means 71, a search means 72, and an iris image determination means 73. The acquisition means 71 acquires a target iris image which is an iris image of processing target. The search means 72 searches one or more similar registered iris images similar to the target iris image from the registered iris images. When a person corresponding to the target iris image and a person corresponding to the similar registered iris image are different, the iris image determination means 73 determines that the target iris image and the similar registered iris image are iris images of the color contact lens.

Figure 12:
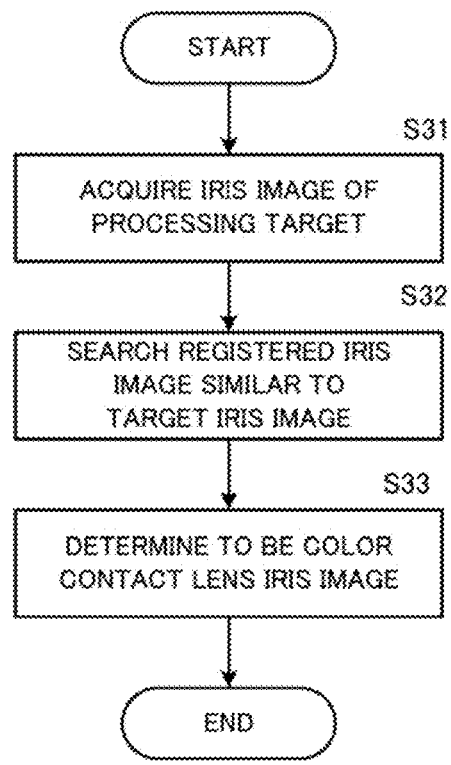
FIG. 12 is a flowchart of determination processing according to a third example embodiment.

FIG. 12 is a flowchart of determination processing according to the third example embodiment. First, the acquisition means 71 acquires the target iris image which is an iris image of processing target (step S31). The search means 72 searches one or more similar registered iris images similar to the target iris image from the registered iris images (step S32). When the person corresponding to the target iris image and the person corresponding to the similar registered iris image are different, the iris image determination means 73 determines that the target iris image and the similar registered iris image are iris images of the color contact lens (step S33).

According to the third example embodiment, the acquisition means 71 acquires the iris image of processing target, and the search means 72 searches one or more registered iris images, which are similar to the iris image of processing target. Thus, the registered iris images which may be the color contact lens iris image can be extracted by comparing the images. Since the iris image determining means 73 determines that the target iris image and the similar registered iris image are iris images of the color contact lens when the person corresponding to the target iris image and the person corresponding to the similar registered iris image are different. Therefore, one or more iris images of color contact lens can be detected from the registered iris images based on the identity of the person.

Fourth Example Embodiment

Figure 13:
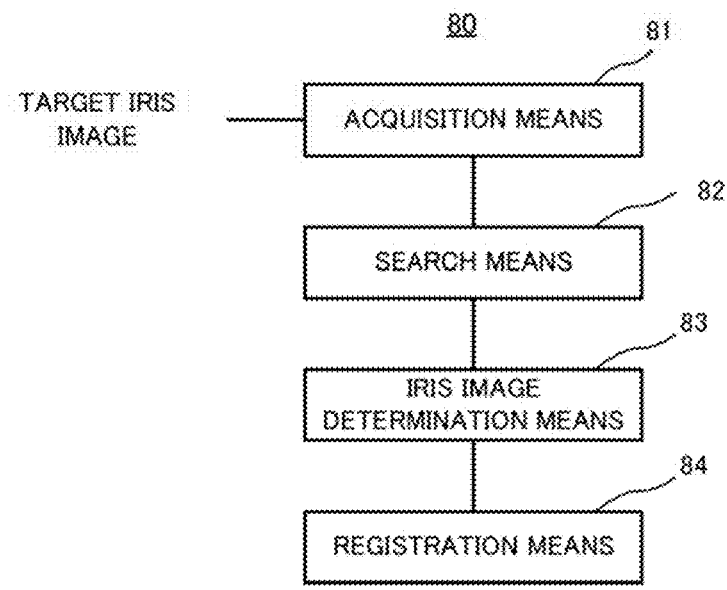
FIG. 13 is a block diagram showing a functional configuration of an information processing device according to a fourth example embodiment.

Next, a description will be given of a fourth example embodiment of the present disclosure. FIG. 13 is a block diagram illustrating a functional configuration of an information processing device according to a fourth example embodiment. The information processing device 80 determines whether or not an inputted iris image is an iris image of a color contact lens and registers the result. Specifically, the information processing device 80 includes an acquisition means 81, a search means 82, an iris image determination means 83, and a registration means 84. The acquisition means 81 acquires a target iris image which is an iris image of processing target. The search means 82 searches one or more similar registered iris images that are similar to the target iris image from the registered iris images. When the person corresponding to the target iris image and the person corresponding to the similar registered iris image are different, the iris image determination means 83 determines that the target iris image and the similar registered iris image are iris images of the color contact lens. The registration means 84 registers an attribute indicating whether or not the target iris image is an iris image of a color contact lens in the database in association with the target iris image.

Figure 14:
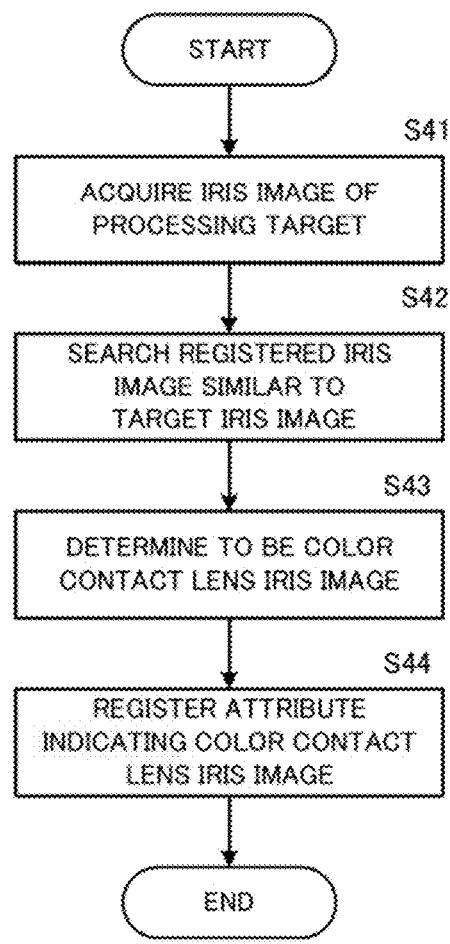
FIG. 14 is a flowchart of determination processing according to the fourth example embodiment.

FIG. 14 is a flowchart of determination processing according to the fourth example embodiment. First, the acquisition means 81 acquires a target iris image which is an iris image of processing target (step S41). The search means 82 searches one or more similar registered iris images similar to the target iris images from the registered iris images (step S42). When the person corresponding to the target iris image and the person corresponding to the similar registered iris image are different, the iris image determination means 83 determines that the target iris image and the similar registered iris image are iris images of the color contact lens (step S43). The registration means 84 registers an attribute indicating whether or not the target iris image is an iris image of the color contact lens in the data base in association with the target iris image (step S44).

According to the configuration of the fourth example embodiment, the registration means 84 registers an attribute indicating whether or not the target iris image is an iris image of a color contact lens in the database in association with the target iris image. Therefore, by referring to this attribute, it is possible to easily determine whether or not each iris image registered in the database is an iris image of the color contact lens.

A part or all of the example embodiments described above may also be described as the following supplementary notes, but not limited thereto.

Supplementary Note 1

An information processing device comprising:
an acquisition means configured to acquire a target iris image which is an iris image of processing target;
a search means configured to search one or more similar registered iris images which are similar to the target iris image, from registered iris images;
an iris image determination means configured to determine that the target iris image and the similar registered iris image are iris images of a color contact lens, when a person corresponding to the target iris image and a person corresponding to the similar registered iris image are different persons.

Supplementary Note 2

The information processing device according to Supplementary note 1, further comprising a person determination means configured to determine identity of the person corresponding to the target iris image and the person corresponding to the similar registered iris image.

Supplementary Note 3

The information processing device according to Supplementary note 2,
wherein the acquisition means acquires biometric information of a same person as the target iris image, and
wherein the person determination means determines the identity of the person using biological information of the same person as the target iris image and the biological information of the same person as the similar registered iris image.

Supplementary Note 4

The information processing device according to Supplementary note 3, wherein the biometric information includes at least one of a face image, a fingerprint image, a palm print image, and voice data.

Supplementary Note 5

The information processing device according to any one of Supplementary notes 1 to 4, further comprising a registration means configured to register the target iris image in a database,
wherein the registration means registers an attribute indicating whether or not the target iris image is an iris image of the color contact lens in the database in association with the target iris image.

Supplementary Note 6

The information processing device according to Supplementary note 5, wherein the registration means registers, as the attribute, binary information indicating whether or not the target iris image is the iris image of the color contact lens.

Supplementary Note 7

The information processing device according to Supplementary note 5, wherein the registration means registers, as the attribute, a number of the similar registered iris images or a value corresponding to the number of the similar registered iris images.

Supplementary Note 8

The information processing device according to any one of Supplementary notes 5 to 7, wherein, when the target iris image is not registered in the database, the registration means performs at least one of a display and a voice output prompting registration of the iris image.

Supplementary Note 9

The information processing device according to any one of Supplementary notes 1 to 8, wherein the search means rotates one of the target iris image and the registered iris image relative to the other to determine whether or not the target iris image and the registered iris image are similar.

Supplementary Note 10

An information processing method comprising:
acquiring a target iris image which is an iris image of processing target;
searching one or more similar registered iris images which are similar to the target iris image, from registered iris images; and
determining that the target iris image and the similar registered iris image are iris images of a color contact lens, when a person corresponding to the target iris image and a person corresponding to the similar registered iris image are different persons.

Supplementary Note 11

A non-transitory recording medium recording a program, the program causing a computer to execute processing of:
acquiring a target iris image which is an iris image of processing target;
searching one or more similar registered iris images which are similar to the target iris image, from registered iris images; and
determining that the target iris image and the similar registered iris image are iris images of a color contact lens, when a person corresponding to the target iris image and a person corresponding to the similar registered iris image are different persons.

While this disclosure has been described with reference to the example embodiments and examples, this disclosure is not limited to the above example embodiments and examples. Various changes that can be understood by those skilled in the art can be made in the configuration and details of this disclosure within the scope of this disclosure.

DESCRIPTION OF SYMBOLS

2 Registration database
12 Processor
21 Iris image acquisition unit
22 Face image acquisition unit
23 Registration unit
24 Color contact lens determination unit
100 Iris image registration device

What is claimed is:

1. An information processing device comprising:
   a memory storing instructions; and
   one or more processors configured to execute the instructions to:
   acquire a target iris image and a target face image of a target person;
   search a plurality of registered iris images to locate an iris image that is similar to the target iris image, by comparing and collating the plurality of registered iris images with the target iris image, wherein collating the plurality of registered iris images with the target iris image is performed by rotating at least one of the plurality of registered iris images or the target iris image;
   when not having successfully located an iris image in the plurality of registered images that is similar to the target iris image, perform authentication on the target person using only the target face image;
   when having successfully located an iris image in the plurality of registered images that is similar to the target iris image,
      compare the target face image and a registered face image of a face of a registered person having an iris included in the located iris image to determine whether the registered person and the target person are the same person;
      when having determined that the registered person and the target person are the same person, conclude that the target person is wearing a colored contact lens and perform authentication on the target person using only the target face image and then acquire a new target iris image of the target person in which the target person is not wearing the colored contact lens; and
      when having determined that the registered person and the target person are not the same person, conclude that the target person is not wearing a colored contact lens and perform authentication on the target person using both the target faced image and the target iris image.

2. The information processing device according to claim 1, wherein the one or more processors are further configured to execute the instructions to, when having successfully located the iris image in the plurality of registered images that is similar to the target iris image:
   determine an identity of the target person; and
   determine an identity of the registered person.

3. The information processing device according to claim 2,
   wherein the one or more processors are further configured to execute the instructions to, when having successfully located the iris image in the plurality of registered images that is similar to the target iris image:
   acquire biometric information of the target person; and
   determine the identity of the person also using the biological information of the target person.

4. The information processing device according to claim 3, wherein the biometric information includes at least one of, a fingerprint image, a palm print image, and voice data.

5. The information processing device according to claim 1, wherein the one or more processors are further configured to execute the instructions to:
   register the target iris image in a database and
   register, in the database, an attribute indicating whether or not the target person in the target iris image is wearing the colored contact lens in association with the target iris image.

6. The information processing device according to claim 5, wherein the one or more processors register, as the attribute, binary information indicating whether or not the target person in the target iris image is wearing the colored contact lens.

7. The information processing device according to claim 5, wherein the one or more processors register, as the attribute, a number of the similar registered iris images or a value corresponding to the number of the similar registered iris images.

8. The information processing device according to claim 5, wherein, before registering the target iris image is not registered in the database, the one or more processors perform at least one of a display and a voice output prompting registration of the iris image.

9. An information processing method performed by a computer and comprising:
   acquiring a target iris image and a target face image of a target person;
   searching a plurality of registered iris images to locate an iris image that is similar to the target iris image, by comparing and collating the plurality of registered iris images with the target iris image, wherein collating the plurality of registered iris images with the target iris image is performed by rotating at least one of the plurality of registered iris images or the target iris image;
   when not having successfully located an iris image in the plurality of registered images that is similar to the target iris image, performing authentication on the target person using only the target face image;
   when having successfully located an iris image in the plurality of registered images that is similar to the target iris image,
      comparing the target face image and a registered face image of a face of a registered person having an iris included in the located iris image to determine whether the registered person and the target person are the same person;
      when having determined that the registered person and the target person are the same person, concluding that the target person is wearing a colored contact lens and perform authentication on the target person using only the target face image and then acquire a new target iris image of the target person in which the target person is not wearing the colored contact lens; and
      when having determined that the registered person and the target person are not the same person, concluding that the target person is not wearing a colored contact lens and perform authentication on the target person using both the target faced image and the target iris image.

10. A non-transitory computer-readable recording medium recording a program executable by a computer to perform processing comprising:

acquiring a target iris image and a target face image of a target person;

searching a plurality of registered iris images to locate an iris image that is similar to the target iris image, by comparing and collating the plurality of registered iris images with the target iris image, wherein collating the plurality of registered iris images with the target iris image is performed by rotating at least one of the plurality of registered iris images or the target iris image;

when not having successfully located an iris image in the plurality of registered images that is similar to the target iris image, performing authentication on the target person using only the target face image;

when having successfully located an iris image in the plurality of registered images that is similar to the target iris image, comparing the target face image and a registered face image of a face of a registered person having an iris included in the located iris image to determine whether the registered person and the target person are the same person;

when having determined that the registered person and the target person are the same person, concluding that the target person is wearing a colored contact lens and perform authentication on the target person using only the target face image and then acquire a new target iris image of the target person in which the target person is not wearing the colored contact lens; and when having determined that the registered person and the target person are not the same person, concluding that the target person is not wearing a colored contact lens and perform authentication on the target person using both the target faced image and the target iris image.

\* \* \* \* \*